(12) United States Patent
Halberstadt

(10) Patent No.: US 8,519,688 B2
(45) Date of Patent: Aug. 27, 2013

(54) BURST MODE CONTROLLER AND METHOD

(75) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 259 days.

(21) Appl. No.: 13/095,756

(22) Filed: Apr. 27, 2011

(65) Prior Publication Data

US 2011/0267024 A1 Nov. 3, 2011

(30) Foreign Application Priority Data

Apr. 28, 2010 (EP) ..................................... 10161366

(51) Int. Cl.
*G05F 1/573* (2006.01)
*G05F 1/00* (2006.01)
*H02M 3/24* (2006.01)
*H02M 3/335* (2006.01)

(52) U.S. Cl.
USPC ........... 323/282; 323/351; 323/271; 323/222; 363/21.12; 363/97

(58) Field of Classification Search
USPC ...... 323/284, 285, 271, 323, 282; 363/21.12, 363/97
See application file for complete search history.

(56) References Cited

U.S. PATENT DOCUMENTS

| 6,166,926 | A | 12/2000 | Nath et al. | |
| 7,279,869 | B2 * | 10/2007 | Tzeng et al. | 323/222 |
| 2002/0072399 | A1 * | 6/2002 | Fritz | 455/572 |
| 2008/0175029 | A1 | 7/2008 | Jung et al. | |
| 2009/0097289 | A1 | 4/2009 | Schetters | |
| 2010/0264891 | A1 * | 10/2010 | Lee | 323/282 |

FOREIGN PATENT DOCUMENTS

| CN | 1309461 A | 8/2001 |
| CN | 101218737 A | 8/2001 |
| WO | 2004/030194 A1 | 4/2004 |
| WO | 2004030194 A1 | 4/2004 |
| WO | 2009/020707 A1 | 2/2009 |
| WO | 2009020707 A1 | 3/2009 |

OTHER PUBLICATIONS

Choi, Jin-ho, et al. "The Improved Burst Method in the Stand-by Operation of Power Supply ," IEEE, vol. 1, pp. 426-432, (Feb. 22, 2004).
ST Microelectronics, "High Performance, L6599-Based HB-LLC Adapter With PFC for Laptop Computers," Application Note 2321, pp. 1-29, (Aug. 2006).
Extended European Search Report for counterpart European Patent Application No. 10161366.9 (Oct. 1, 2010).
AN2321 Application Note: Reference Design: High Performance, L6599-based HB-LLC Adapter with PFC for Laptop Computers. 2006 ST Microelectronics. pp. 29.
Jin-Ho Choi, et al. "The Improved Burst Mode in the Stand-By Operation of Power Supply." vol. 1, 22, Feb. 22, 2004. pp. 426-432, XP010704321. ISBN 978-0-7803-8269-5.
Extended European Search Report (APN 10161366.9) Jan. 10, 2010. European Patent Office, Munich Germany.

* cited by examiner

*Primary Examiner* — Bao Q Vu
*Assistant Examiner* — Zekre Tsehaye

(57) ABSTRACT

Consistent with an example embodiment, there is method and a controller for controlling burst mode operation of a switched mode power supply (SMPS). It also relates to switched mode power supplies comprising such a controller. One way to increase the efficiency of a switched mode power supply is to operate it at a power level close to the optimum efficiency point for a brief period, followed by a period where the power supply is not switching during which no energy is wasted. This type of operation is known as "burst mode" and results in high efficiency at low power levels.

13 Claims, 8 Drawing Sheets

BURST MODE CONTROLLER AND METHOD

CROSS-REFERENCE TO RELATED APPLICATIONS

This application claims the priority under 35 U.S.C. § 119 of European patent application no. 10161366.9, filed on Apr. 28, 2010, the contents of which are incorporated by reference herein.

The invention relates to a method and a controller for controlling burst mode operation of a switched mode power supply (SMPS). It also relates to switched mode power supplies comprising such a controller.

The efficiency of switched mode power supplies and its variation with load is becoming increasingly important. Switched mode power supplies are commonly used in power adapters for small low-load appliances and for applications where the drawing of a load is intermittent, for example chargers for mobile phones. The input power requirements for switched mode power supplies under low and no-load conditions are therefore also becoming increasingly important.

The no-load input power depends on the efficiency of the switched mode power supply at extremely low power levels, where only the circuitry inside the power supply itself has to be supplied with power, typically consuming approximately 50 mW to 200 mW. It is clearly desirable to have a high efficiency at these low power levels.

One way to increase the efficiency of a switched mode power supply is to operate it at a power level close to the optimum efficiency point for a brief period, followed by a period where the power supply is not switching during which no energy is wasted. This type of operation is known as "burst mode" and results in high efficiency at low power levels. The L6599 from ST Microelectronics is an example of a switched mode power supply device that can operate in burst mode.

Operation in burst mode can result in frequency components below the audible upper limit of 20 kHz. There is therefore a risk that audio noise will be produced by vibrations in the power components, for example the transformers and capacitors, of a power supply operating in burst mode. As the human ear is most sensitive in the region between 1 kHz and 10 kHz, it is most desirable not to use a burst frequency in this region.

In most applications, the ripple voltage at the output of the converter has to be maintained within certain limits. This requires certain burst on times depending on the output power required.

Furthermore, if a positive load step occurs during the period when the power supply is not switching, the switched mode power supply has to react relatively fast to prevent a sudden drop in output voltage due to a lack of available power. This requires that an error signal from the output voltage regulation loop should be able to start the next burst as soon as possible.

FIG. 1 shows the relationship between output power and ripple voltage and FIG. 2 shows the relationship between output power and burst frequency (the reciprocal of the burst period, defined as the period between the start of successive bursts of switching) for a typical application under 3 different modes of operation.

In the first mode, the lengths of the bursts of switching are fixed (plots for 50 μs, 100 μs, 200 μs and 600 μs are shown as A, B, C and D respectively). The burst frequency is adapted according to the output power, producing variable ripple voltages.

In this mode, the next burst of switching can easily be started by the error signal from the output voltage regulation loop giving a simple solution. However, from FIGS. 1 and 2 it is clear that this mode leads to a large ripple voltage at low loads and a burst frequency in the kHz range at higher loads. There is no acceptable compromise that gives a ripple voltage lower than 240 mV and a burst frequency below 1 kHz over the power range shown. In practice, this is the situation for most applications.

In the second mode, the burst frequency is fixed at 1 kHz (see plot E). The lengths of the switching bursts are varied according to the output power, producing variable ripple voltages.

This mode provides acceptable values of burst frequency and ripple voltage over the power range shown in FIGS. 1 and 2. Furthermore, it can easily be realised using a fixed frequency oscillator, which triggers the start of each burst of switching. The length of the switching bursts can be regulated by the error loop, which ends each burst when the voltage at the output rises above the desired regulation value.

However, the error loop often includes an error amplifier with a frequency compensation network and opto-coupler due to mains isolation requirements. During burst mode operation, the error amplifier will often saturate at one of the supply rail voltages and can only detect the output voltage crossing the desired regulation value rather than its absolute value. This is because the error amplifier normally has a high voltage gain in order to reduce the static error at the output. Therefore, the magnitude of its output voltage is very high even for a small error signal. Thus, due to the structure of the error amplifier-opto-coupler loop, the output voltage of the error amplifier saturates, often close to the positive supply rail or ground, and is able to detect only a small variation at the output voltage. This also means that during a low frequency burst with a larger ripple than is detectable by the error loop, the error loop can only detect if the output is lower or higher than the desired value. During burst mode with fixed burst frequency and fixed power during the burst, the burst is started by the frequency timer and stopped when the output voltage crosses the desired value. When the burst duty cycle reaches 100%, the maximum power of the burst mode is reached. However, when more power is requested, the burst stays on during the whole burst interval as the output voltage value is not reached, and as there is insufficient power the output voltage drops. Therefore another mechanism is needed to decide that the converter should go out of burst mode to a higher power mode. This decision can be made by detecting that the output voltage is too low at the end of the 100% burst on time, but the disadvantage with this is that the system cannot change to the higher power mode within a shorter time than the burst repetition time.

This leads to a problem if a positive load step occurs which requires more power than is available in burst mode. In this case the output voltage will drop and the error signal cannot detect this as the error amplifier output is already saturated. It is not possible to detect that the power being supplied is too low until the current burst period ends, by which time a large voltage drop may already have occurred, especially when a burst frequency below 1 kHz is used. To prevent this, a larger and more expensive electrolytic capacitor may be used at the output, but this increases the cost and size.

In the third mode, the ripple voltage is fixed at 250 mV (see plot F). Both the burst frequency and the lengths of the switching bursts are varied to maintain this ripple voltage.

This mode also gives acceptable ripple voltage and burst frequency values, and it is often used. In principle, each burst of switching can be started at the lowest value of the output voltage during a burst cycle (which occurs just before the start of the burst) and stopped at a maximum value of the output voltage (which occurs at the end of the burst). However, this is rather difficult to realise in practice, especially if mains isolation is required. As mentioned above, this is normally achieved using an error loop including an error amplifier with frequency compensation network and opto-coupler. Alternatively, it is possible to sense the output voltage via an auxiliary winding on the transformer.

However, there is a problem with sensing via an auxiliary winding. This problem arises because the amplitude of the ripple voltage at the output is relatively small compared to the value of the output voltage itself. Also high frequency noise due to switching is present at the output voltage and on the auxiliary winding. This makes it difficult to separate the desired minimum and maximum values of output voltage from the noise. With mains isolation using an error amplifier and opto-coupler, the frequency compensation network in the error loop and the fact that the output of opto-coupler or error amplifier saturates causes the shape of the AC part of the output voltage to be different from the shape of the AC part of the signal at the primary side of the error loop. Therefore, minimum and maximum values of the output voltage do not correspond with the minimum and maximum values at the primary side opto-coupler output.

A compromise solution that is used in practical applications is to use the voltage at the opto-coupler output to start and stop the bursts of switching. This is possible because the gain from the output terminal to the opto-coupler output is set by the output sensing network, compensation network and opto-coupler circuitry. This gain defines the relationship between a change in the output voltage and a change in the control parameter (in most cases the voltage at the opto-coupler output). Starting each burst when the voltage at the opto-coupler output rises above a predefined value and stopping each burst when it falls below a predefined lower value gives almost constant ripple voltage behaviour. The disadvantage with this approach is that the power level and the points at which each burst starts and stops are coupled. The power level is controlled by the control parameter, often the voltage at the control input. The control input is also used to start and stop a burst, the burst starting and stopping at predefined voltage levels at the control input. For certain converter types, such as resonant converters, the actual voltage at the control input required to obtain a certain output power can vary significantly depending on the value and tolerance of the resonant components. This means that using a fixed voltage at the control input to start and stop the burst makes it difficult to define the required power level during the burst. As the power level is directly related to efficiency, the disadvantage is that the efficiency of the converter during burst mode is not sufficiently under control.

Also, the burst frequency depends on several parameters such as output capacitance, compensation network and gain settings. Therefore, the bandwidth of the application in combination with the width of the window at the control input (variation between no load and full load) is now related to the burst frequency. This means that a certain ripple voltage at the control input occurs depending on bandwidth chosen for the regulation loop to get proper response during a normal operation mode (i.e. non-burst mode). The bandwidth is related to the output capacitance (determined by an electrolytic capacitor at the output), the gain of the converter stage itself and the voltage window at the control input to vary the output from no power to full power. All those parameters are also coupled to the burst frequency, which cannot therefore be set independently. This gives several restrictions and limitations in practice with respect to selecting the burst frequency, the output power level and efficiency during each burst. The design of switched mode power supplies employing this technique is complicated.

In accordance with a first aspect of the invention, there is provided a method for controlling burst mode operation of a switched mode power supply (SMPS), in which a burst period comprises a burst of operation of the SMPS during which the SMPS is generating power at a first, higher level, the SMPS generating power at a second, lower level during the remainder of the burst period, the method comprising:

a) receiving a control input signal indicating the start of a current burst period;

b) starting a burst of operation of the SMPS and measuring the elapsed time during the current burst period;

c) calculating a desired duration of the burst of operation of the SMPS in the current burst period from:
  i) the duration of a burst of operation of the SMPS in a preceding burst period;
  ii) the duration of the preceding burst period; and
  iii) the desired duration of the current burst period;
and d) comparing the elapsed time during the current burst period with the desired duration calculated in step (c) and ceasing the burst of operation of the SMPS if the elapsed time during the current burst period is greater than or equal to the desired duration calculated in step (c).

The method according to this invention can be used with conventional switched mode power supplies to provide a burst mode operation, which solves the problems mentioned above. Using this method for controlling burst mode operation, it is now possible to operate at a well-defined burst frequency with acceptable ripple voltages. These parameters can be set independently, the burst frequency depending on the repetition rate of the control input signal (derived from an overall regulation loop) and the ripple voltage depending on the length of the burst of operation and the length of the burst period. Furthermore, a controller embodying this method can react instantaneously to load steps as explained below.

The duration of a burst of operation of the SMPS in a preceding burst period, the duration of the preceding burst period, and the desired duration of the current burst period will normally be represented by signals, and thus the calculation in step (c) will be performed on the values of these signals to produce a value for a signal representing the desired duration of the burst of operation of the SMPS in the current burst period. Correspondingly, wherever the duration of a burst of operation of the SMPS in a preceding burst period, the duration of the preceding burst period, or the desired duration of the current burst period are referred to below it should be understood that signals representing these may be involved instead.

The second, lower power level may be zero, in which case operation of the SMPS will cease entirely during the remainder of the burst period.

Typically, the control input signal is received when the value of a regulated parameter crosses a threshold value. The regulated parameter may be a voltage or current, and it may cross the threshold either by increasing or decreasing in value relative to the threshold value. In a practical embodiment, the crossing of the threshold value by the regulated parameter can be detected by comparing a signal representing the regulated parameter with a reference value and asserting the control input signal if the signal representing the regulated parameter reaches the reference value (either by rising or falling in value).

The elapsed time during the current burst period is preferably measured by generating a signal proportional to the elapsed time since the start of the current burst period.

Typically, this signal is an output signal generated by a timer, which is started in response to the indication of the start of the current burst period.

In one embodiment, the desired duration calculated in step (c) is equal to the product of the duration of the burst of operation of the SMPS in the preceding burst period with the ratio of the desired duration of the current burst period to the duration of the preceding burst period.

In another embodiment, the desired duration calculated in step (c) is equal to the sum of the duration of the burst of operation of the SMPS in the preceding burst period and the product of a weighting coefficient with the difference between the desired duration of the burst period and the duration of the preceding burst period.

Normally, step (b) further comprises sampling the signal representing the duration of the preceding burst period and retaining the sampled signal for use in step (c).

Typically, the method further comprises sampling the desired duration calculated in step (c) and retaining the sampled value for use in the comparison of step (d).

Preferably, the method further comprises modifying the value of the desired duration calculated in step (c) by application of a predefined filter function.

In a preferred embodiment, the predefined filter function multiplies the desired duration calculated in step (c) by a filter coefficient and adds to this the product of one minus the filter coefficient with the duration of the burst of operation of the SMPS in the preceding burst period.

The filter coefficient may conveniently have the same value as the weighting coefficient mentioned above.

The desired duration calculated in step (c) is typically constrained between maximum and minimum values.

In accordance with a second aspect of the invention, there is provided a controller for controlling burst mode operation of a switched mode power supply (SMPS), in which a burst period comprises a burst of operation of the SMPS during which the SMPS is generating power at a first, higher level, the SMPS generating power at a second, lower level during the remainder of the burst period, the controller comprising:

a) a first comparator for receiving a control input signal indicating the start of the current burst period and comparing it with a reference voltage, the output of the first comparator being adapted to switch from a first logic level to a second logic level when the control input signal crosses the reference voltage;

b) a timer adapted to respond to the switch from the first logic level to the second logic level at the output of the first comparator by measuring the elapsed time during the current burst period;

c) a calculation unit adapted to monitor:
  i) the duration of a burst of operation of the SMPS in the preceding burst period;
  ii) the duration of the preceding burst period; and
  iii) the desired duration of the current burst period;
  and to calculate a desired duration of the burst of operation of the SMPS in the current burst period from the monitored values; and d) a first circuit adapted to respond to the switch from the first logic level to the second logic level at the output of the first comparator by starting the burst of operation of the SMPS and to compare the elapsed time during the current burst period with the desired duration calculated in step (c), ceasing the burst of operation of the SMPS if the elapsed time during the current burst period is greater than or equal to the desired duration calculated in step (c).

The first circuit may comprise a latch (or other memory element, such as a clocked flip-flop) adapted to respond to the switch from the first logic level to the second logic level at the output of the first comparator by asserting a signal for starting the burst of operation of the SMPS and a second comparator for comparing the elapsed time during the current burst period with the desired calculated in step (c), the output of the second comparator being adapted to switch from a first logic level to a second logic level if the elapsed time during the current burst period is greater than or equal to the desired duration calculated in step (c), the latch being adapted to respond to the switch from the first logic level to the second logic level at the output of the second comparator by negating the signal for starting the burst of operation of the SMPS.

Alternatively, the first circuit may comprise a second comparator for comparing the elapsed time during the current burst period with the desired duration calculated in step (c) and adapted to assert a signal for starting the burst of operation of the SMPS if the elapsed time during the current burst period is lower than the desired duration calculated in step (c) and to negate the signal for starting the burst of operation of the SMPS if the elapsed time during the current burst period is greater than the desired duration calculated in step (c).

The controller typically further comprises a filter unit adapted to modify the value of the desired duration calculated in step (c) by application of a predefined filter function.

In accordance with a third aspect of the invention, a controller for controlling burst mode operation of a switched mode power supply (SMPS) comprising a circuit is adapted to perform the method of the first aspect of the invention.

In a fourth aspect of the invention, there is provided a switched mode power supply comprising a controller according to either of the second or the third aspect of the invention.

The switched mode power supply may further comprise circuitry for controlling the output power generated by a converter stage of the switched mode power supply, wherein the circuitry is adapted to control the output power to the higher of a first value derived from a regulated parameter and a second value, which is predetermined to represent a minimum output power, during a burst of operation of the SMPS.

The regulated parameter may be, for example, the output voltage, output current or output power of the SMPS.

Examples of the invention will now be described in detail with reference to the accompanying drawings, in which.

The invention provides a method for controlling burst mode operation of a switched mode power supply (SMPS), in which a control input signal triggers the start of a current burst period, a burst of operation of the SMPS and resets a timer, which indicates the elapsed time during the current burst period. A value for the desired duration of the burst of operation of the SMPS in the current burst period is calculated from the value of the duration of a burst of operation of the SMPS in a preceding burst period, the value of the duration of the preceding burst period and the value of the desired duration of the current burst period. When the elapsed time during the current burst period indicated by the timer is greater than or equal to the calculated value for the desired duration of the burst of operation of the SMPS in the current burst period then the burst of operation of the SMPS is ceased.

Figure 1:
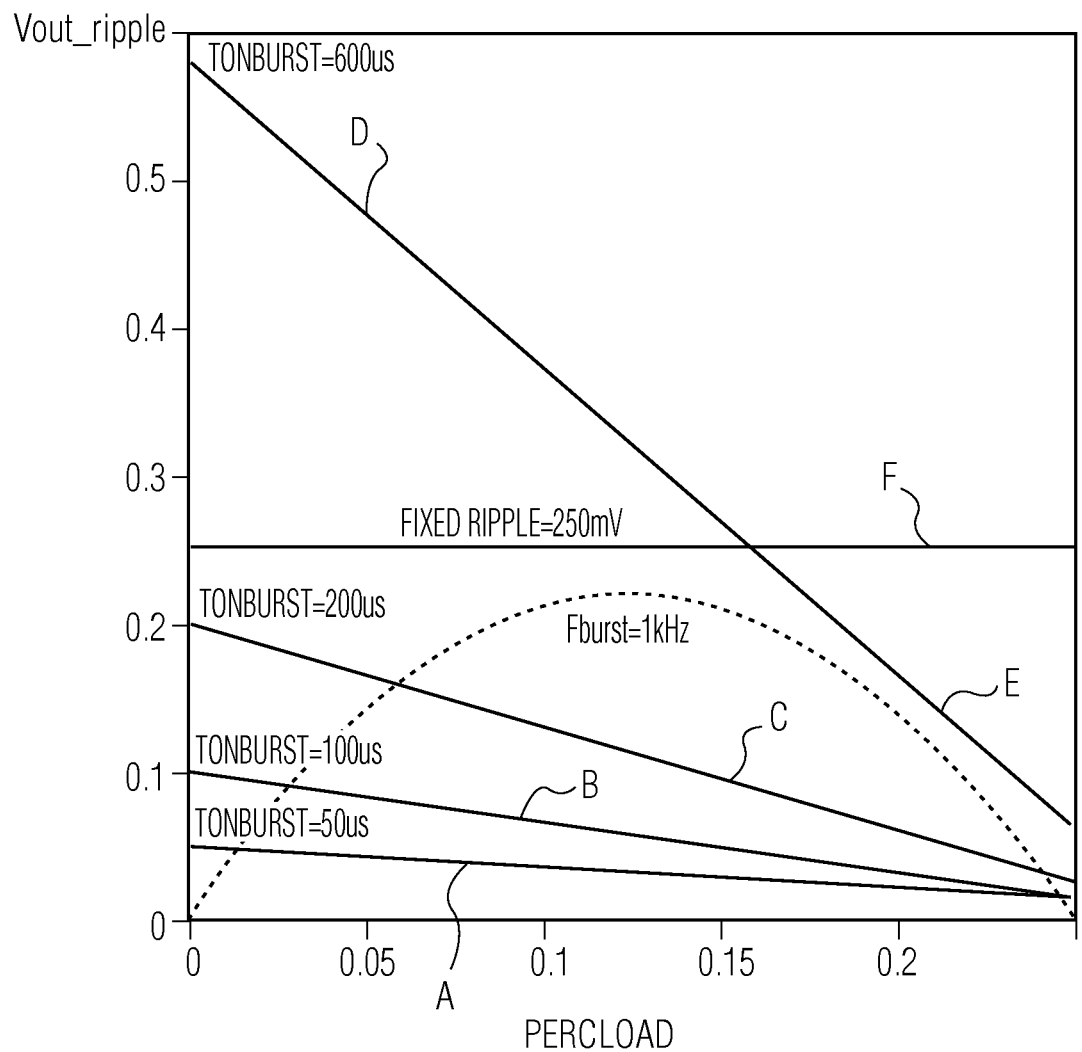
FIG. 1 shows ripple voltage as a function of output power for prior art burst mode techniques.
Figure 2:
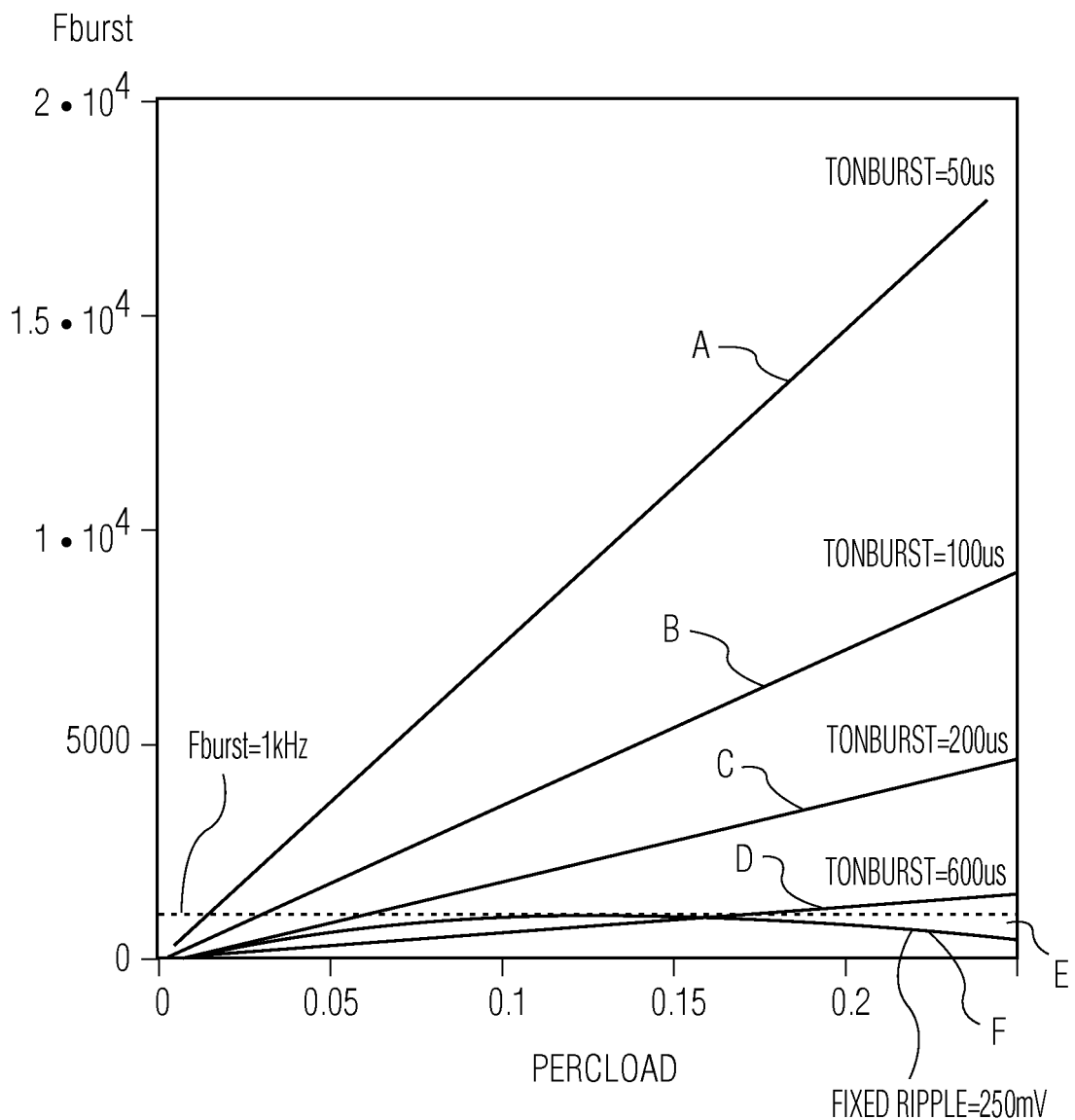
FIG. 2 shows burst frequency as a function of output power for prior art techniques.
Figure 3:
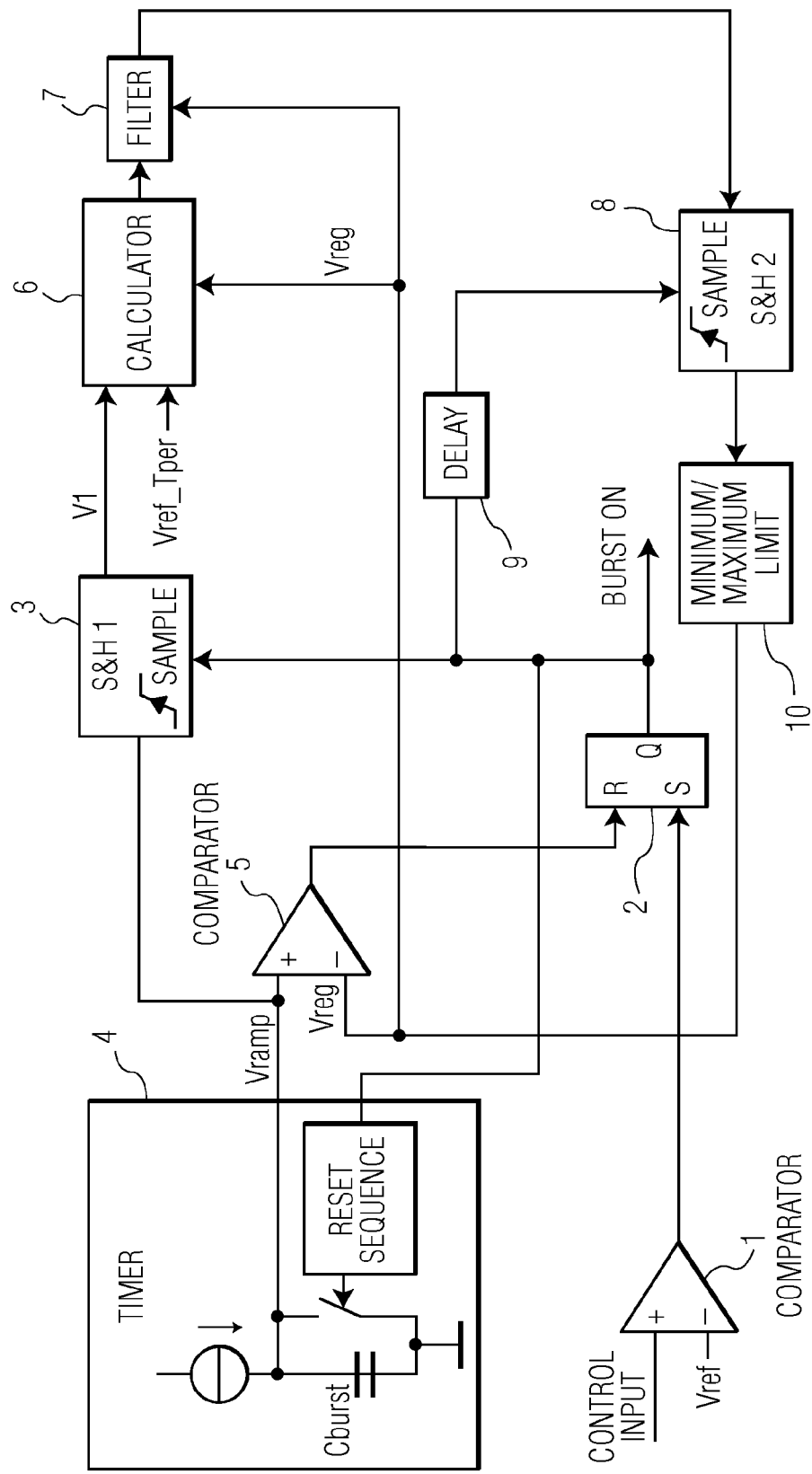
FIG. 3 shows a circuit of a burst mode controller operable according to the invention.

FIG. 3 shows a block diagram of a burst mode controller operable according to the invention. In this, a comparator 1 receives a control input signal at its non-inverting input. Its inverting input is held at a reference voltage $V_{ref}$. When the voltage of the control input signal rises above the value of $V_{ref}$, the output of comparator 1 is driven to the positive supply voltage (i.e. it represents a logic high). The output of comparator 1 is coupled to the set (S) input of SR latch 2, the output pin (Q) of which is driven high as a result of the logic high on the S pin.

The control input signal is provided from the circuitry controlling the overall regulation of the switched mode power supply. It is asserted (i.e. driven to a logic high, rising above $V_{ref}$) when the value of the regulated parameter (e.g. output voltage, output current or output power) falls below a predefined threshold. The assertion of the control input signal marks the start of a burst period or cycle.

Various events occur as the result of the output pin of the SR latch 2 being driven high. Firstly, the "Burst On" signal is asserted, and this causes the start of a burst of switching. At the same time, sample-and-hold circuit 3 is triggered, causing the sample-and-hold circuit 3 to sample the voltage at the output of timer 4. The sampled voltage ($V_1$) is the output voltage from the timer 4 at the end of the preceding burst period, and it represents the duration of the preceding burst period. The timer 4 is also reset slightly after the sample-and-hold circuit 3 is triggered, its output voltage ($V_{ramp}$) dropping to a predefined starting voltage, typically 0V.

As shown in FIG. 3, a typical timer circuit 4 comprises a current source supplying a capacitor connected in parallel with a reset switch. This causes the output voltage from the timer 4 ($V_{ramp}$) to rise linearly until it saturates, which will be slightly below the positive supply voltage. The capacitor in the timer will discharge on reset relatively quickly compared to the duration of the burst period.

The voltage $V_{ramp}$ from the timer 4 is compared to a voltage $V_{reg}$ by comparator 5. When $V_{ramp}$ rises above the value of $V_{reg}$, the output of comparator 5 is driven to a logic high. The output of comparator 5 is coupled to the reset (R) pin of SR latch 2. The output pin of the SR latch 2 is therefore driven to a logic low, causing the "Burst On" signal to be negated. This stops the current burst of switching.

A calculator circuit 6 calculates a new value for $V_{reg}$ based on the current value of $V_{reg}$, the sampled value $V_1$ and a voltage $V_{ref\_Tper}$, which represents the desired duration of the burst period.

$V_{ref\_Tper}$ is a fixed value determined by a bandgap reference voltage generator in the control circuit. Its value is chosen such that there is sufficient margin above to allow a certain maximum for $V_1$ below the supply voltage. The capacitor in the timer is chosen to set the slope of $V_{ramp}$ depending on the desired burst frequency. The desired burst frequency is then equal to $$\frac{I}{C_{burst} \cdot V_{ref\_Tper}},$$

where I is the current supplied by the current source to the timer capacitor and $C_{burst}$ is the value of the timer capacitor.

If the new value for $V_{reg}$ were used for determining the end of the current burst of switching directly then this would lead to convergence to the required duration of the burst of switching to achieve the desired burst period time. However, if a load step then this approach would lead to a sudden increase or decrease (depending on the direction of the load step) of the burst frequency. Therefore, a filter 7 is provided, coupled to the output of the calculator 6 to increase the time constant of the regulation loop so that it is several times the burst period.

In one variant, the calculator 6 and filter 7 calculate a new value for $V_{reg}$ according to the following equations:

$$V_X = V_{reg_N} \times \frac{V_{ref\_Tper}}{V_1}$$

$$V_{reg_{N+1}} = K_1 \cdot V_X + (1 - K_1) V_{reg_N}$$

where: $V_X$ is the output from calculator 6
$V_{reg_N}$ is the current value of $V_{reg}$
$V_{reg_{N+1}}$ is the new value of $V_{reg}$ (the output from filter 7)
$K_1$ is a filter coefficient applied by filter 7

The value of $K_1$ defines the time constant of the filter. Setting $K_1$ to a value of one will give the fastest response, while setting K1 to zero keeps $V_{reg}$ fixed at the previous value. A typical value for $K_1$ is 0.75.

In a second variant, the calculator 6 and filter 7 calculate a new value for $V_{reg}$ according to the following equations:

$$V_X = V_{reg_N} + K_2(V_{ref\_Tper} - V_1)$$

$$V_{reg_{N+1}} = K_2 \cdot V_X + (1 - K_2) V_{reg_N}$$

where: $K_2$ is a filter coefficient applied by calculator 6 and filter 7

A delay circuit 9 is coupled to the output of SR latch 2, and the output of the delay circuit 9 is coupled to the sample input of sample-and-hold circuit 8. Thus, just after the start of a burst of switching (i.e. when the Q pin of SR latch 2 is driven high), the output of delay circuit 9 is driven high, causing the new value of $V_{reg}$ ($V_{reg_{N+1}}$) at the output of filter 7 to be sampled. A limiter circuit 10 ensures that the new value of $V_{reg}$ does not fall beyond maximum and minimum limits, and if it does the value of $V_{reg}$ is clamped to the maximum or minimum limit appropriately.

The new value of $V_{reg}$ is then available at the inverting input of comparator 5. The calculation of a new value for $V_{reg}$ and its propagation to the inverting input of comparator 5 happens sufficiently quickly that the new value can be used to determine the end of a burst of switching in the current burst period.

The limiter circuit 10 prevents two possible problems from occurring. The first problem could occur at very low power levels in which a single power conversion cycle at the desired burst frequency provides too much power. By clamping the value of $V_{reg}$ at a minimum level, the burst period will automatically be increased (and the burst frequency therefore decreased) to ensure that this problem does not arise.

The reason for the decrease in burst frequency is explained as follows. With $V_{reg}$ at a minimum level, a minimum burst length is defined, which is however too large for the desired burst period. During this burst, a well-defined amount of energy is transferred to the output capacitor. Therefore, the voltage at the output capacitor will rise to a certain level above the desired value. The small load connected to the power supply will discharge the output capacitor slowly and as soon as the voltage drops below the desired value, the error amplifier and opto-coupler will cause the voltage at the control input to rise, triggering the next burst via comparator 1. The automatic decrease in burst frequency occurs because, for example, a 10% increase in $V_{reg}$ (with respect to what it should be to achieve the desired burst frequency) will give a 10% increase in burst length. Thus, 10% more energy is delivered to the output capacitor giving a 10% larger step in output voltage. Therefore, it takes 10% longer for the load to discharge the output capacitor to the desired value of output voltage, and so it can be seen that a 10% larger value of $V_{reg}$ will immediately give a 10% lower burst frequency during the same burst cycle. When there is no active minimum limit, the calculator will reduce $V_{reg}$ until the proper burst frequency occurs. However, if less than one complete switching cycle is needed at the desired burst frequency to deliver the required power then $V_{reg}$ would be regulated towards zero, making it difficult to calculate a new value for $V_{reg}$ by multiplication, but with an active limit $V_{reg}$ is larger than desired, therefore giving a larger burst period and lower burst frequency.

The other problem that could occur is caused by the fact that the main regulation loop controls the burst period. It is therefore possible that the burst period can become longer than the timer 4 can handle. If the value of $V_{reg}$ becomes larger than the saturation level of the timer output voltage then the burst of switching cannot be switched off by the circuit of FIG. 3. By clamping the value of $V_{reg}$ to a level below the saturation level of the timer output voltage, limiter circuit 10 ensures that this does not happen.

Figure 4:
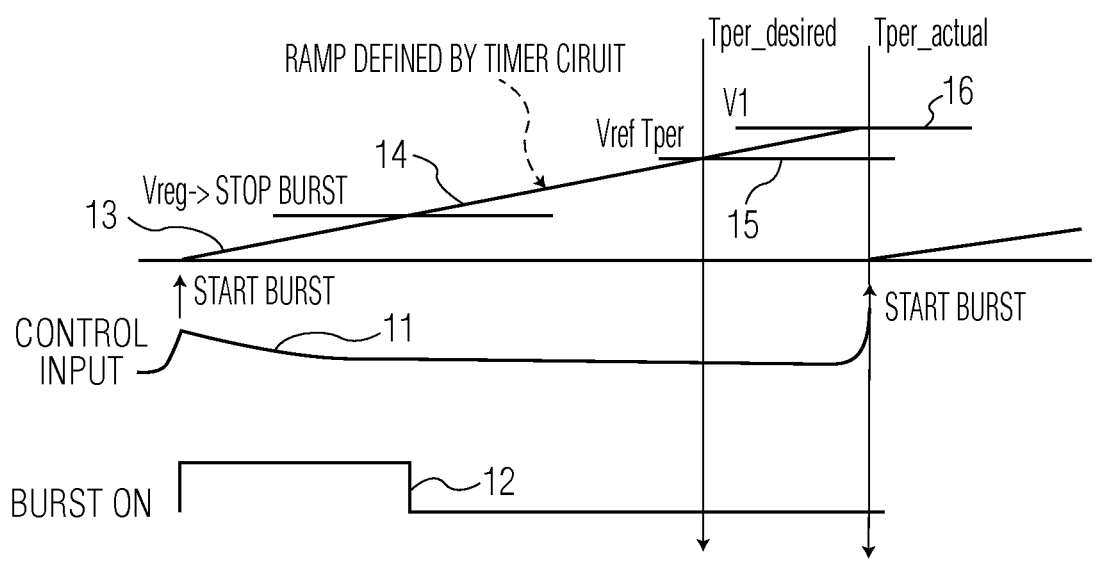
FIG. 4 shows waveforms at various points within the circuit of FIG. 3.

FIG. 4 shows the waveforms at various points within the circuit of FIG. 3 during a burst cycle and is helpful to understand the operation of the circuit. Each burst cycle is started when the control input signal is driven to a logic high, which causes the timer 4 to reset and the "Burst On" signal to be asserted, as explained earlier. The control input signal is shown by plot 11 in FIG. 4, each "Burst On" and timer output signals are shown by plots 12 and 13 respectively.

The timer output signal increases linearly as shown. When it exceeds the value of $V_{reg}$ (shown at 14 in FIG. 4), the comparator 5 will cause the SR latch 2 to be reset, which in turn causes the "Burst On" signal to be driven low, ending the burst of switching in the current burst period.

The timer output signal continues to increase linearly eventually crossing the $V_{ref\_T_{per}}$ level and then reaching $V_1$. This is the voltage it has reached when the control input signal is next driven high, marking the start of the next burst period. At this point, the voltage $V_1$ is sampled by sample-and-hold circuit 3 for use by calculator 6 to calculate a new value for $V_{reg}$.

The burst mode controller explained above with reference to FIGS. 3 and 4 relies on the fact that the average power over a complete burst cycle or period ($P_{average}$) is equal to the product of the power during the switching burst ($P_{burston}$) and the ratio between duration of the switching burst ($T_{burston}$) and the burst period ($T_{burstper}$) at a given power drawn from the output of the switched mode power supply. Thus:

$$P_{average} = P_{burston} \times \frac{T_{burston}}{T_{burstper}}$$

This means that for a given output power and power during the switching burst, the ratio $T_{burston}:T_{burstper}$ is fixed giving:

$$\frac{T_{burston\_desired}}{T_{burstper\_desired}} = \frac{T_{burston\_actual}}{T_{burstper\_actual}}$$

where: $T_{burston\_desired}$ is the desired switching burst duration
$T_{burston\_actual}$ is the actual switching burst duration in the last cycle
$T_{burstper\_desired}$ is the desired burst period
$T_{burstper\_actual}$ is the actual burst period in the last cycle Thus, at a constant output power, the duration of the switching burst for the next burst cycle can easily be determined based on the actual burst period and the desired burst period using the following equation:

$$T_{burston\_desired} = \frac{T_{burston\_actual}}{T_{burstper\_actual}} \times T_{burstper\_desired}$$

It is from the above equation that the equation used by the first variant of the calculator 5, namely $$V_X = V_{reg_N} \times \frac{V_{ref\_T_{per}}}{V_1},$$

is derived.

The need to directly react to a load step only allows the start of a switching burst to be triggered as a result of a changing control variable from the main regulation loop (in a burst on interval this also gives the possibility to directly detect if power should be further increased). This means that the burst frequency cannot be set directly as the start of the next burst and therefore also the burst frequency is fully determined by the main regulation loop. However, given the degree of freedom for choosing the duration of the switching burst, it is possible to adapt the burst frequency by the relatively slow control circuit shown in FIG. 3 that takes a few cycles to adapt the on time to get the desired burst frequency.

Figure 5:
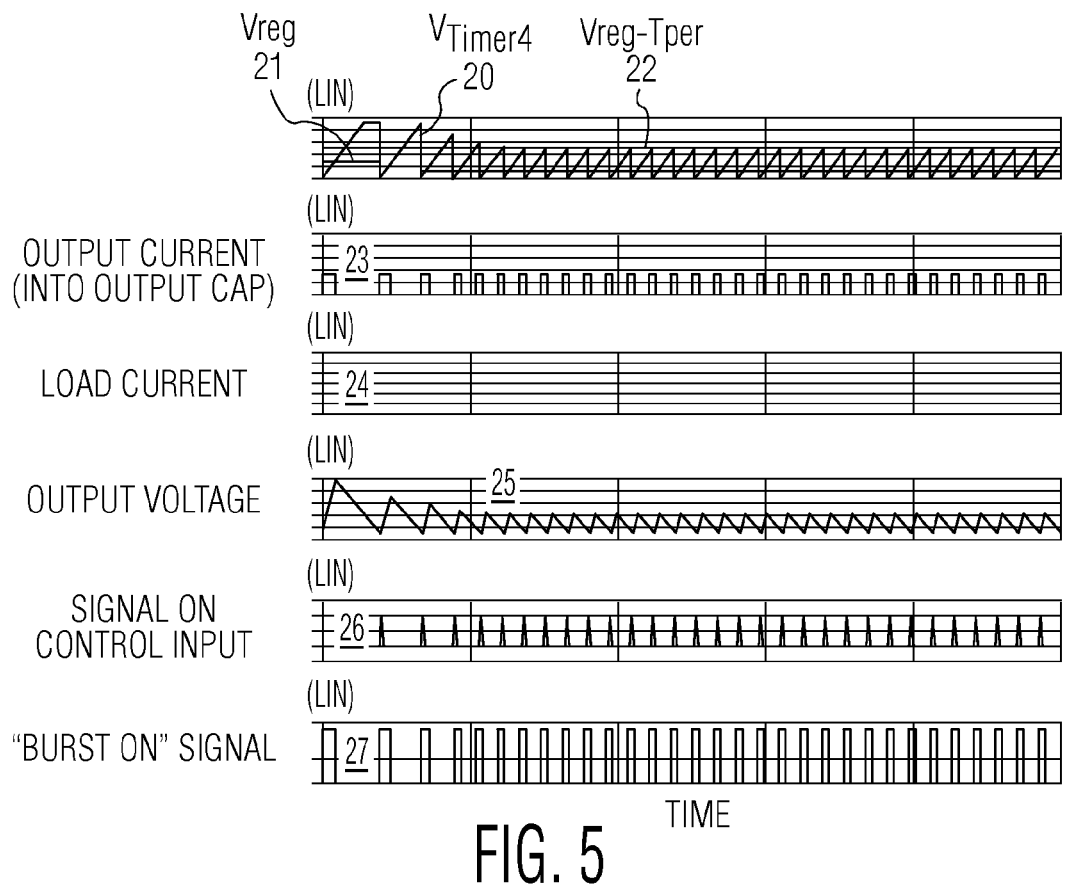
FIGS. 5 to 8 show simulation results of the burst mode controller under various operating conditions.

FIG. 5 shows the results of a simulation of the circuit of FIG. 3 where the power is reduced during burst mode operation. In this simulation, a simplified model of the switched mode power supply is used to reduce the overall time required to carry out the simulation. The power supply is modeled as a power source which dumps power into the output capacitor of the power supply. The power is directly proportional to the voltage present on a power control input. It is configured to generate a fixed minimum output power of 21.2 W below a control voltage of 1.17V. The output current that is dumped into the output capacitor depends on the output power according to $I_{OUT}=P_{OUT}/V_{OUT}$. In this model, no high frequency switch mode action is present. Thus, DC output current flows in the output capacitor during the switching bursts only, while in a practical switched mode power supply current pulses will flow into the output capacitor. For the burst mode operation, this is not important, as the average current over a switching burst will determine the final output voltage at the end of the switching burst.

In FIG. 5, a variety of plots are shown. The output voltage from the timer 4, $V_{reg}$ and the value of $V_{ref\_T_{per}}$ are shown as plots 20, 21 and 22 respectively. Plots 23, 24, 25, 26 and 27 show the output current (into the output capacitor), load current, output voltage, the signal on the control input and the "Burst On" signal respectively. The regulation of the burst frequency by controlling the duration of the switching bursts is clearly visible. Starting from t=0, the desired peak voltage of the timer output voltage ($V_{ref\_T_{per}}$) is 2.5V. However, at t=0 the value of $V_{reg}$ is too high to achieve this and the resulting value of $V_1$ (the peak voltage at the timer output voltage) exceeds $V_{ref\_T_{per}}$. However, it converges within a few cycles to the desired 2.5V level, due to $V_{reg}$ being adjusted to the desired power level burst frequency. As explained above, the converging process is deliberately made slower than the burst period (the value of $K_1$ referred to above is 0.75 in the simulation).

Figure 6:
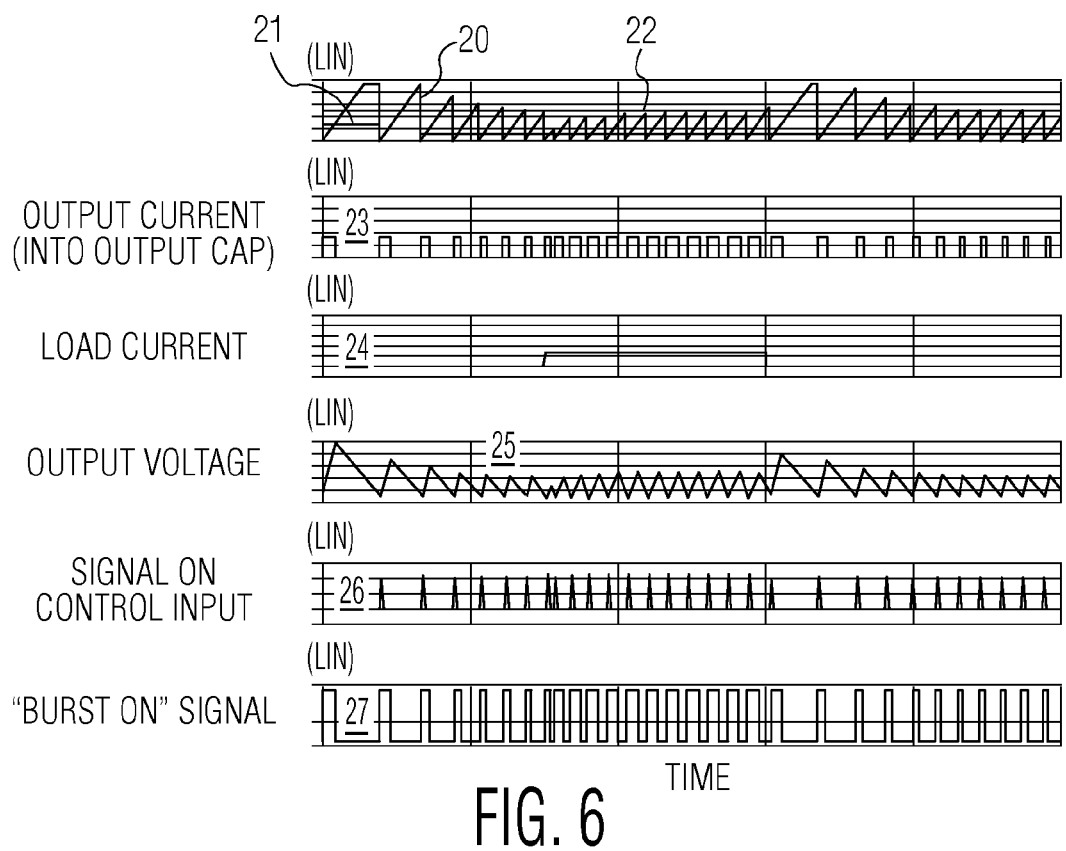

In FIG. 6 the effect of a load step is shown. The temporary change in burst frequency, which depends on the rate of change of the load step, is clearly visible.

Figure 7:
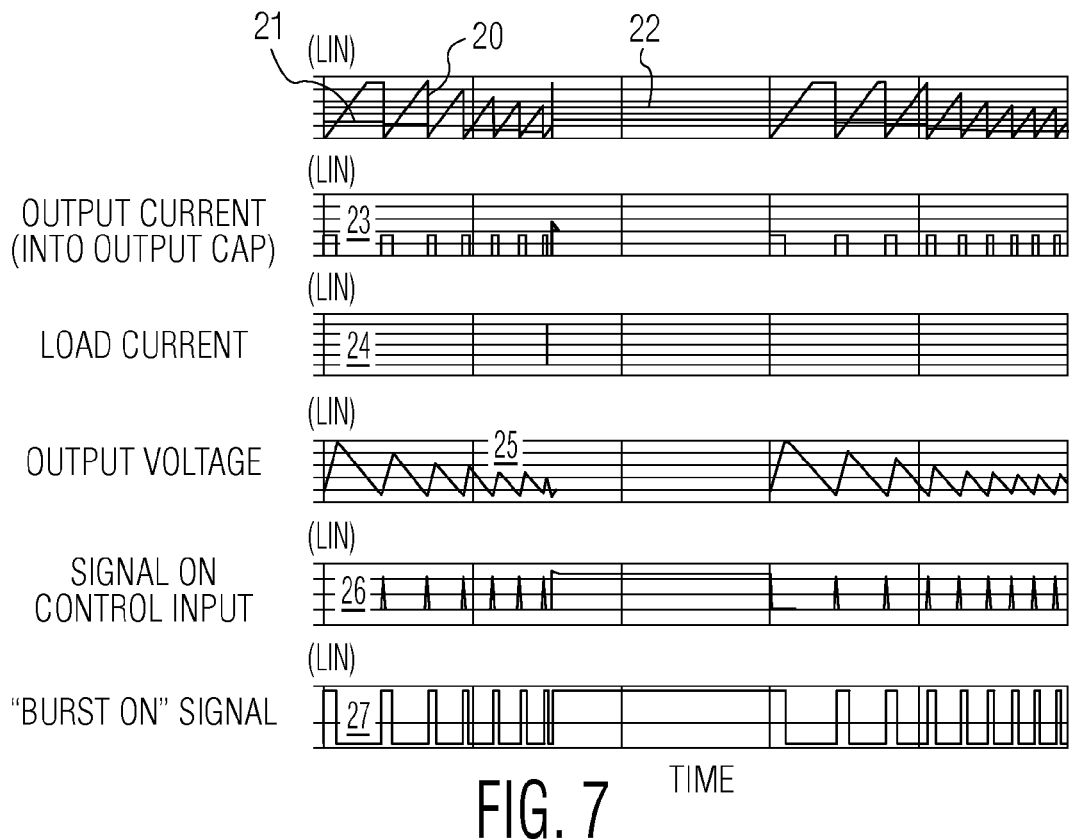

FIG. 7 shows the effect of a positive load step above the maximum power level available during burst mode operation. At the load step, the output voltage starts falling with a large negative slope. The rate of change of the control input after that moment allows instant reaction on the output and starts the next burst of switching much earlier than would be the case according to a fixed frequency burst mode. During burst mode the power level of the converter is preferably limited to a minimum while the burst of switching occurs. Circuitry for performing this function is described below with reference to FIG. 10. In FIG. 7 this minimum is 21.2 W corresponding to a control voltage of 1.17V. As long as the load requirement is smaller than the power supplied during the burst on time, the output voltage will rise during the burst of switching, causing the control voltage to drop almost immediately. This explains why the power during the burst of switching is at the minimum power level (21.2 W in the example of FIG. 7). However, when the load requirement is larger than the power supplied during the burst of switching, the control input will rise further, as the output voltage keeps falling further. Given the fact that the power is limited to a minimum, but not to a maximum, this means that the power can be increased further towards the desired level equal to the load requirement when the control input rises above the level defining the minimum power (1.17V in the example of FIG. 7). As the control input is now continuously at a level above $V_{ref}$ coupled to comparator 1, latch 2 is continuously set (the set input of latch 2 overriding the reset input). Therefore the "Burst On" signal is continuously active. In fact this is a natural way that causes the controller to change over to a normal, non-burst mode of operation, in which the output power can be regulated at levels above those possible during the burst mode operation. During the interval that the "Burst On" signal is continuously active, the timer is reset, and the next $V_{reg}$ signal at the input of comparator 5 was determined at the last rising slope of the "Burst On" signal. Therefore, the system is ready to determine the length of the next burst of switching when a new burst occurs. As soon as the load reduces below the burst power, the control input will regulate down until the minimum power is reached. This means that the set input of latch 2 is negated, allowing latch 2 to be reset by the timer reaching $V_{reg}$ and the burst of switching ceases. According to this way of operation, normal operation is a special case of burst mode with an infinite burst on time and the possibility to increase the power during the burst on time is provided.

Figure 8:
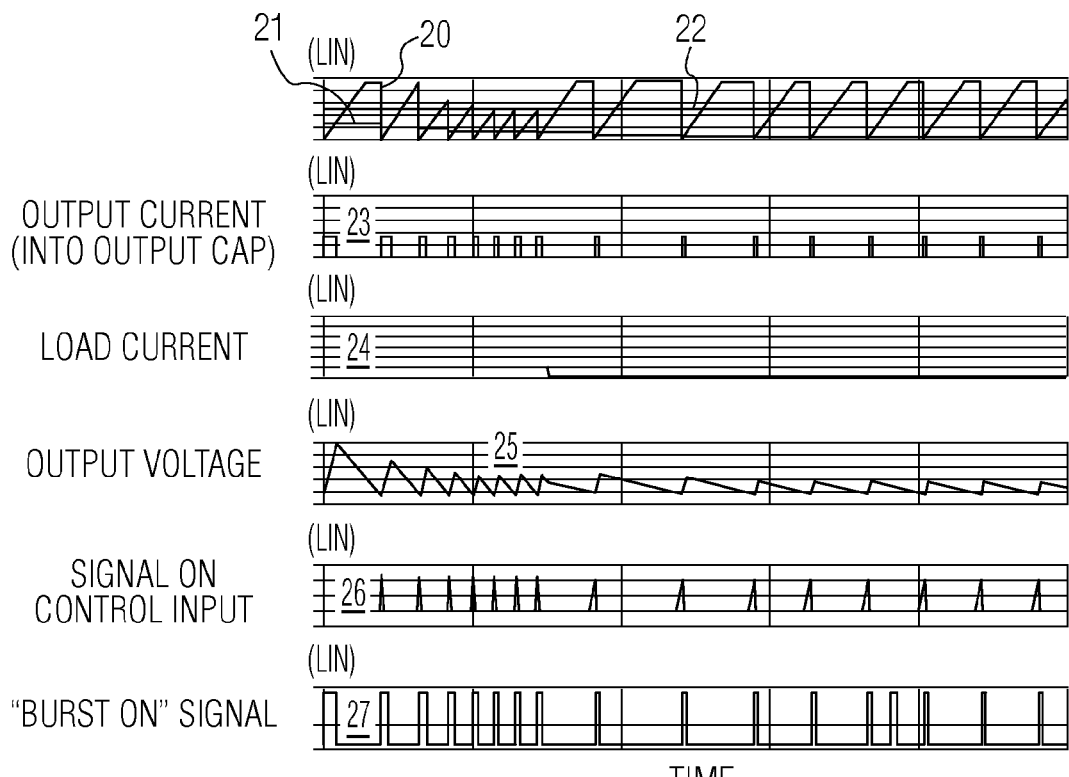

In FIG. 8, the effect of a very low load is shown. At such low power levels, $V_{reg}$ is clamped at the minimum value, setting the switching burst duration to the minimum possible. As a result, the burst period that is defined by the load is longer than that desired, but this is acceptable as the ripple voltage at the output is low, due to the short switching burst duration.

Figure 9:
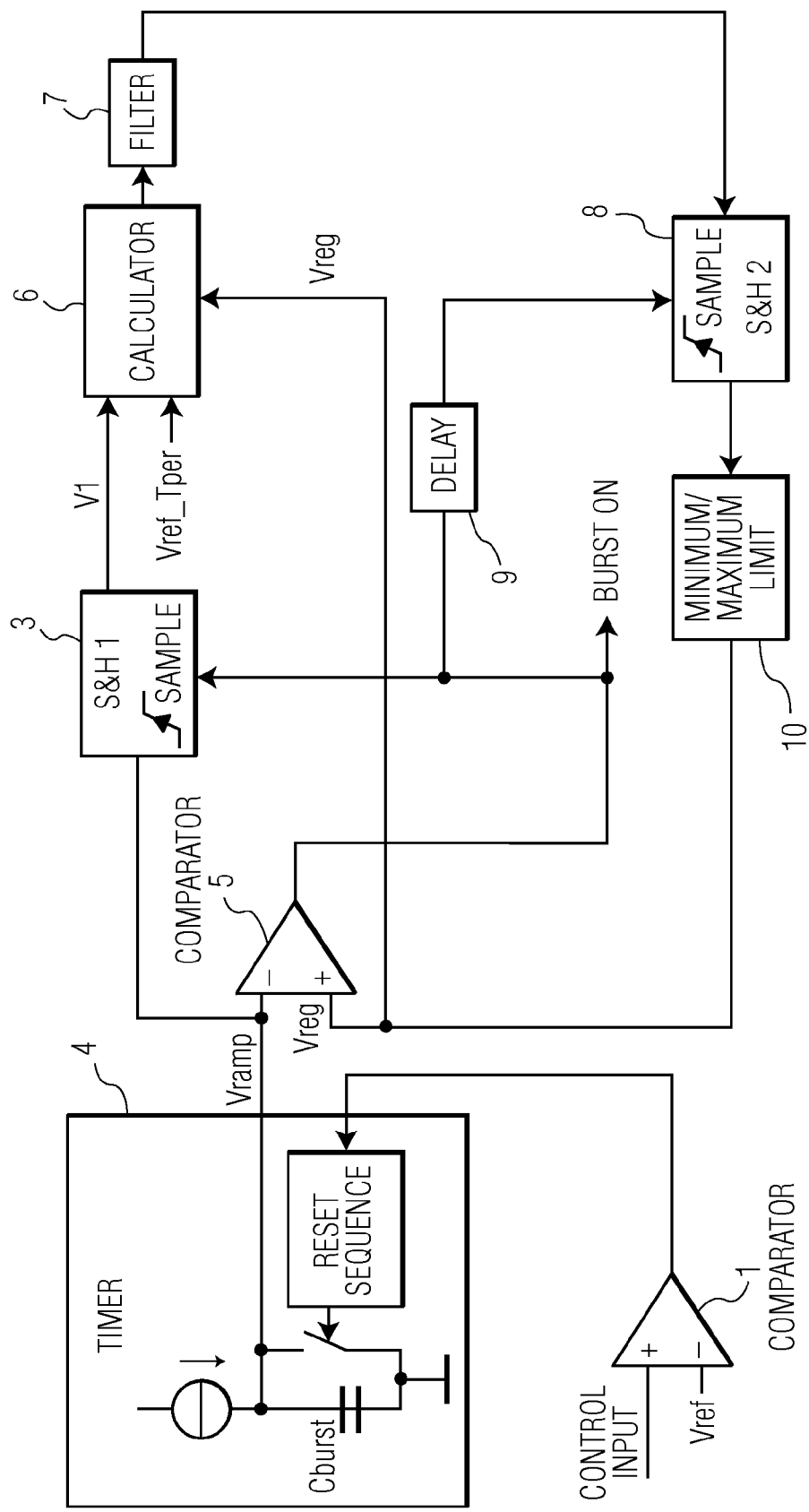
FIG. 9 shows another embodiment of a burst mode controller operable according to the invention.

FIG. 9 shows a second embodiment of a burst mode controller according to the invention. This embodiment is very similar to the embodiment of FIG. 3, the only structural difference being the omission of the latch 2. Instead, the output from comparator 1 is coupled directly to the reset input of the timer 4 and the "Burst On" signal is provided directly by the output of comparator 5.

In this circuit, when the output from comparator 1 is high (i.e. when the control input signal exceeds the reference signal at the non-inverting and inverting inputs of comparator 1) then the timer 4 is reset. Thus, the inverting input of comparator 5 is lower than the value of $V_{reg}$ on the inverting input and the "Burst On" signal is asserted. The output signal from timer 4 then rises and when it exceeds the value of $V_{reg}$ the output from comparator 5 goes low and the "Burst On" signal is negated. The remainder of the circuit operates in the same manner as the FIG. 3 embodiment.

Figure 10:
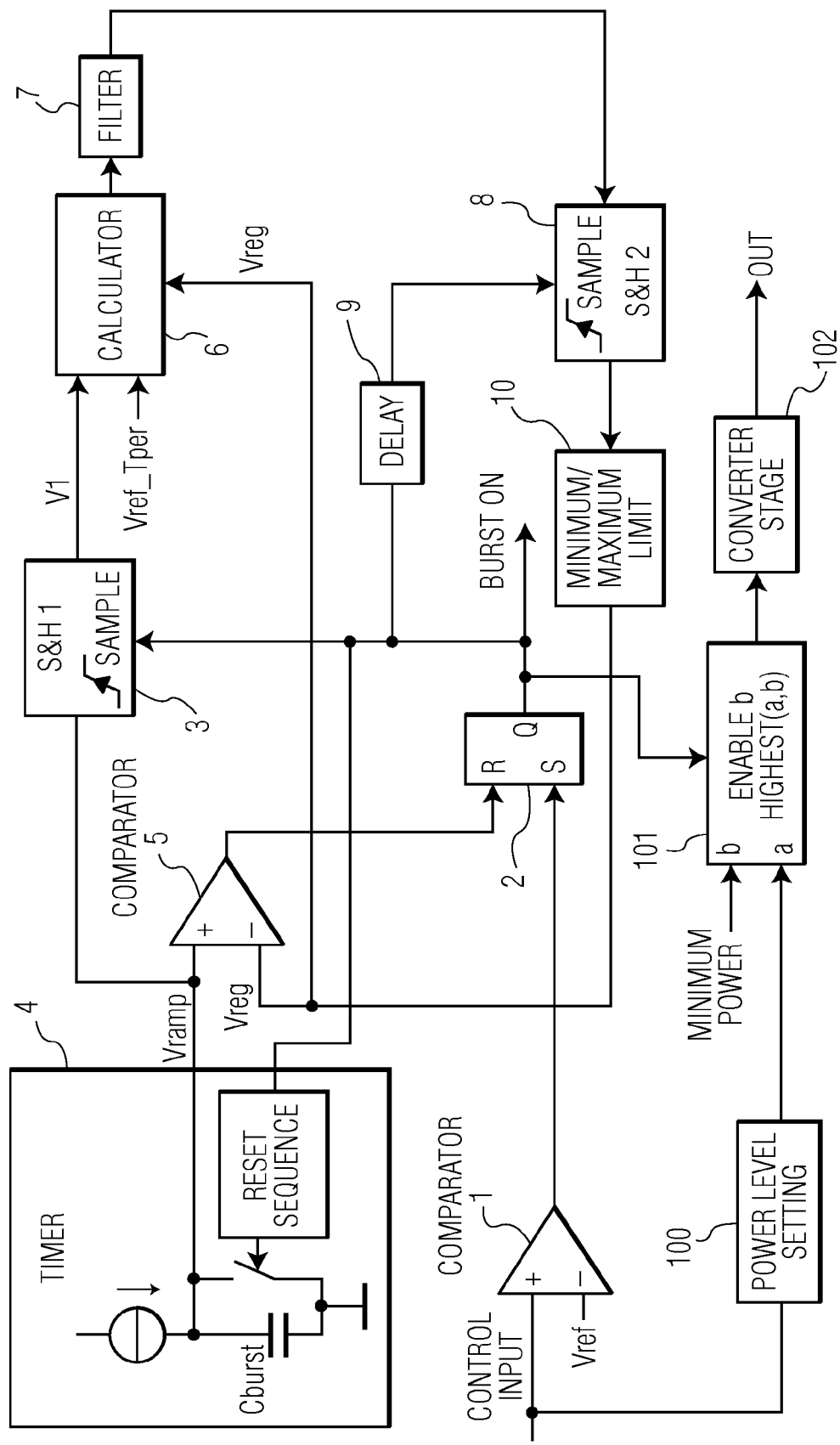
FIG. 10 shows additional circuitry for controlling the minimum power supplied by a SMPS.

FIG. 10 shows additional circuitry alongside the circuit of FIG. 3. This additional circuitry comprises a power level setting circuit 100, a selection circuit 101 and a converter stage 102. The converter stage 102 generates the desired output power under control of the burst mode controller and power level setting circuit 100 and selection circuit 101.

The control input signal is derived from the output of the converter by comparing it with a reference value. An error signal resulting from this comparison then determines the control input signal, thereby closing the control loop. The power level setting circuit 100 sets the proper level for the output power of the converter stage 102 depending on the value of the control input signal (which as before also controls the operation of the burst mode controller). Depending on the control method and the type of converter used there is a variety of possibilities to set the output power, for example by setting the switching frequency, primary peak current, primary on time, or a combination of these.

During normal (i.e. non-burst mode) operation, the selection circuit 101 selects the output of the power level setting circuit 100 as the basis for controlling the output power level from the converter stage 102. Thus, the output power level depends on the control input signal.

However, when a burst of switching is occurring, the Enable input (coupled to the "Burst On" signal) is asserted and this causes the selection circuit 101 to select the higher of the output from power level setting 100 and a preset minimum power level on another input of the selection circuit 101. Thus, the output power level from converter stage 102 is limited to a minimum value.

When a burst of switching has ceased, the "Burst On" signal (and hence the Enable input) are negated. This means that the control input signal (via power level setting circuit 100) can control the power level to a lower value, including zero, than during the burst of switching.

In a variant of the selection circuit 101, the Enable input is always active, but the converter stage is kept off when the bursts of switching have ceased.

In another variant, the Enable input is used as before, but when it is negated, an even lower power level is selected. Thus, when bursts of switching cease the even lower power level is used. With this variant, it is possible to keep the converter switching at an extremely low power level. This can be used in cases where instead of an opto-coupler and secondary sensing of the output, primary sensing is used to sense and regulate the output. For primary sensing of the output, the voltage across a primary transformer winding can be used as a representation of the output voltage. However, as the output voltage can only be sensed when the converter is switching, steps in output voltage can only be detected during switching. Thus, using this variant it is possible to keep the converter switching, which allows the sensing of steps in the output voltage at all times. With this variant it is possible to start the burst of switching without an opto-coupler because the control input signal is updated regularly with the actual value of output voltage.

Using this additional circuitry, the changeover from burst mode to non-burst mode takes place automatically, because the control input can at any moment increase the power instantly.

It is possible to use this additional circuitry also with the embodiment of FIG. 9.

The embodiments described above are based on analogue circuits, but digital techniques and circuits could be used instead, using for example a digital counter as the timer and implementing the calculator and filter functions digitally in a suitably-programmed microcontroller. The sample-and-hold circuits could then be represented by registers in the microcontroller or sections of memory holding the values required for $V_{reg}$, $V_{ref\_}T_{per}$ and $V_1$. Other types of latch or bistable may be employed in place of the SR latch 2, for example a JK latch. A further option is to store $V_{reg}$ digitally in order to allow a large interval of normal operation (non-burst mode) between two intervals of burst mode while starting the second interval of burst mode using the last stored value of $V_{reg}$ of the previous interval of burst mode.

The burst mode controller described could be used with a variety of switched mode power supply topolgies, including resonant, buck, boost, buck-boost, flyback, forward and push-pull types.

It may also be used in applications where audio noise and ripple voltage at the output is a concern and/or where high efficiency is needed at partial load and/or a low input power at no load is required. Such applications include mains adapters, personal computer and laptop power supplies, and TV and monitor power supplies.

Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method for controlling burst mode operation of a switched mode power supply (SMPS), in which a burst period comprises a burst of operation of the SMPS during which the SMPS is generating power at a first, higher level, the SMPS generating power at a second, lower level during the remainder of the burst period, the method comprising:
   a) receiving a control input signal indicating start of a current burst period;
   b) starting a burst of operation of the SMPS and measuring an elapsed time during the current burst period;
   c) calculating a desired duration of the burst of operation of the SMPS in the current burst period from:
      i) the duration of a burst of operation of the SMPS in a preceding burst period;
      ii) the duration of the preceding burst period; and
      iii) the desired duration of the current burst period; and
   d) comparing the elapsed time during the current burst period with the desired duration calculated in step (c) and ceasing the burst of operation of the SMPS if the elapsed time during the current burst period is greater than or equal to the desired duration calculated in step (c).

2. A method according to claim 1, wherein the control input signal is received when the value of a regulated parameter crosses a threshold value.

3. A method according claim 1, wherein the elapsed time during the current burst period is measured by generating a signal proportional to the elapsed time since the start of the current burst period.

4. A method according to claim 1, wherein the desired duration calculated in step (c) is equal to a product of the duration of the burst of operation of the SMPS in the preceding burst period with the ratio of the desired duration of the current burst period to the duration of the preceding burst period.

5. A method according to claim 1, wherein the desired duration calculated in step (c) is equal to a sum of the duration of the burst of operation of the SMPS in the preceding burst period and a product of a weighting coefficient with a difference between the desired duration of the burst period and the duration of the preceding burst period.

6. A method according to claim 1, wherein step (b) further comprises sampling a signal representing the duration of the preceding burst period and retaining the sampled signal for use in step (c).

7. A method according to claim 1, further comprising sampling the value of the desired duration calculated in step (c) and retaining the sampled value for use in the comparison of step (d).

8. A method according to claim 1, further comprising modifying the value of the desired duration calculated in step (c) by application of a predefined filter function.

9. A method according to claim 8, wherein the predefined filter function multiplies the desired duration calculated in step (c) by a filter coefficient and adds to this a product of one minus the filter coefficient with the duration of the burst of operation of the SMPS in the preceding burst period.

10. A method according to claim 1, wherein the desired duration calculated in step (c) is constrained between maximum and minimum values.

11. A controller for controlling burst mode operation of a switched mode power supply (SMPS) in which a burst period comprises a burst of operation of the SMPS during which the SMPS is generating power at a first, higher level, the SMPS generating power at a second, lower level during a remainder of the burst period, the controller comprising:
   a) a first comparator for receiving a control input signal indicating start of a current burst period and comparing it with a reference voltage, an output of the first comparator being adapted to switch from a first logic level to a second logic level when the control input signal crosses the reference voltage;
   b) a timer responding to the switch from the first logic level to the second logic level at the output of the first comparator by measuring the elapsed time during the current burst period;
   c) a calculation unit monitoring:
      i) the duration of a burst of operation of the SMPS in a preceding burst period;
      ii) the duration of the preceding burst period; and
      iii) the desired duration of the current burst period; and to calculate a desired duration of the burst of operation of the SMPS in the current burst period from the monitored values; and
   d) a first circuit responding to the switch from the first logic level to the second logic level at the output of the first comparator by starting the burst of operation of the SMPS and to compare the elapsed time during the current burst period with the desired duration calculated in step (c), ceasing the burst of operation of the SMPS if the elapsed time during the current burst period is greater than or equal to the desired duration calculated in step (c).

12. A controller according to claim 11, further comprising a filter unit adapted to modify the value of the desired duration calculated in step (c) by application of a predefined filter function.

13. A switch mode power supply comprising:
- a controller for controlling burst mode operation of a switched mode power supply (SMPS) in which a burst period comprises a burst of operation of the SMPS during which the SMPS is generating power at a first, higher level, the SMPS generating power at a second, lower level during a remainder of the burst period, the controller comprising:
  - a) a first comparator for receiving a control input signal indicating start of a current burst period and comparing it with a reference voltage, an output of the first comparator being adapted to switch from a first logic level to a second logic level when the control input signal crosses the reference voltage;
  - b) a timer responding to the switch from the first logic level to the second logic level at the output of the first comparator by measuring the elapsed time during the current burst period;
  - c) a calculation unit monitoring:
    - i) the duration of a burst of operation of the SMPS in a preceding burst period;
    - the duration of the preceding burst period; and,
    - iii) the desired duration of the current burst period; and to calculate a desired duration of the burst of operation of the SMPS in the current burst period from the monitored values; and
  - d) a first circuit responding to the switch from the first logic level to the second logic level at the output of the first comparator by starting the burst of operation of the SMPS and to compare the elapsed time during the current burst period with the desired duration calculated in step (c), ceasing the burst of operation of the SMPS if the elapsed time during the current burst period is greater than or equal to the desired duration calculated in step (c); and
- circuitry for controlling the output power generated by a converter stage of the switched mode power supply, wherein the circuitry is adapted to control the output power to the higher of a first value derived from a regulated parameter and a second value, which is predetermined to represent a minimum output power, during a burst of operation of the SMPS.

* * * * *